United States Patent [19]
Costello

[11] Patent Number: 5,321,765
[45] Date of Patent: * Jun. 14, 1994

[54] METHOD AND APPARATUS FOR VERIFYING IDENTITY

[76] Inventor: Brendan D. Costello, Appian Willisham Rd., Barking Tye, Offton, Suffolk IP6 8HY, England

[*] Notice: The portion of the term of this patent subsequent to Aug. 7, 2007 has been disclaimed.

[21] Appl. No.: 824,726

[22] Filed: Jan. 21, 1992

Related U.S. Application Data

[60] Continuation of Ser. No. 540,917, Jul. 25, 1990, abandoned, which is a division of Ser. No. 264,964, Oct. 28, 1988, Pat. No. 4,947,443.

[30] Foreign Application Priority Data

May 7, 1986 [GB] United Kingdom ............... 8611074
May 7, 1986 [GB] United Kingdom ............... 8611075

[51] Int. Cl.$^5$ ............................................. G06K 9/00
[52] U.S. Cl. ............................................. 382/4; 382/5
[58] Field of Search ............... 382/2, 4, 5; 356/71; G06K 9/00, 9/74

[56] References Cited

U.S. PATENT DOCUMENTS 3,292,149 12/1966 Bourne ................................. 382/4
3,383,657 5/1968 Claassen et al. ................... 340/825
3,447,818 6/1969 De Pizzol ............................ 283/68
3,940,795 2/1976 Lemelson ........................... 360/101

(List continued on next page.)

FOREIGN PATENT DOCUMENTS 0043988 1/1982 European Pat. Off. .
0159037 10/1985 European Pat. Off. .
1565115 4/1980 United Kingdom .
2050026A 12/1980 United Kingdom .

OTHER PUBLICATIONS

C. West and D. Wild, IBM Technical Disclosure Bulletin, vol. 17, No. 12, May 1975.
W. J. Deerhake, J. R. Gaffney, Jr. and J. J. Moyer, IBM Technical Disclosure Bulletin, vol. 18, No. 3, Aug. 1975.

Primary Examiner—Yon J. Couso
Attorney, Agent, or Firm—Charles D. Gunter, Jr.

[57] ABSTRACT

The present invention relates to a method for verifying the identity of a person or for relating the identity of a person to a document or other thing presented by that person, which method comprises:
a). Observing topographically related permanent natural physical characteristics on a person to provide a machine readable identification of the identity, relative orientation and relative location of a plurality of the observed characteristics; and
b). Comparing the observed characteristics with a machine readable record of the identification of the identity, relative orientation and relative location of the corresponding topographically related permanent natural physical characteristics purporting to belong to that person;
c) Establishing the existence or otherwise of substantial identity between a plurality of the characteristics held in the record and those observed, the establishment of identity being based upon the identification, relative orientation and relative position of at least some of the characteristics;
characterised in that the establishment of identity also includes:
i) selecting a first set of at least three of the characteristics, which may be the same or different, from the record and a second set of at least three of the characteristics, which may be the same or different, from the observed characteristics;
ii) counting the numbers of some other permanent natural physical feature lying between each of the characteristics with respect to each and every other member of that set for each of the first and second sets; and
iii) comparing the counts for each and every characteristic in a set with the corresponding counts for the other set to substantiate identity between the two sets.

4 Claims, 2 Drawing Sheets

U.S. PATENT DOCUMENTS

| | | | |
|---|---|---|---|
| 4,048,618 | 10/1977 | Hendry | 382/4 |
| 4,151,512 | 4/1979 | Riganati et al. | 382/5 |
| 4,152,056 | 5/1979 | Fowler | 354/62 |
| 4,185,270 | 1/1980 | Fischer, II et al. | 382/5 |
| 4,186,378 | 1/1980 | Moulton | 382/2 |
| 4,208,651 | 6/1980 | McMahon | 382/5 |
| 4,210,899 | 7/1980 | Swonger et al. | 382/5 |
| 4,246,568 | 1/1981 | Peterson | 382/4 |
| 4,310,827 | 1/1982 | Asai | 382/5 |
| 4,322,163 | 3/1982 | Schiller | 356/71 |
| 4,325,570 | 4/1982 | Estrada | 283/69 |
| 4,338,025 | 6/1982 | Engel | 356/71 |
| 4,537,484 | 8/1985 | Fowler et al. | 382/4 |
| 4,569,080 | 2/1986 | Schiller | 382/4 |
| 4,817,183 | 3/1989 | Sparrow | 382/5 |
| 4,947,443 | 8/1990 | Costello | 382/5 |

| | CHARACTERISTIC FEATURE | BINARY CODING |
|---|---|---|
| A1 | — | 0010 |
| A2 | —< | 0100 |
| A3 | ═·═ | 0101 |
| A4 | —•— | 0001 |
| A5 | ≡< | 0011 |
| A6 | ≡< | 0110 |

METHOD AND APPARATUS FOR VERIFYING IDENTITY

This application is a continuation of application Ser. No. 07/540,917, filed Jul. 25, 1990 now abandoned which is a division of Ser. No. 07/264,964 filed on Oct. 28, 1988 now U.S. Pat. No. 4,947,443.

The present invention relates to a method and apparatus for verifying the identity of a person, notably by correlating certain characteristics of the finger print of that person with a machine readable identification of the characteristics of that finger print carried by an object presented concurrently with the finger print at a locus or contained in a record available to the locus.

BACKGROUND TO THE INVENTION

Credit cards and bank cheque cards as currently used by many millions of people carry information relating to the user in machine readable form, usually in the form of one or more magnetic stripes or other recording medium on or in the card carrying binary or other coded information thereon. This provides a simple method for identifying the account to which a transaction relating to that card is to be debited. However, there is no means contained in the card for verifying that the person presenting the card is the true owner of the card, other than the signature of the card holder. Such a signature can readily be copied with sufficient accuracy to satisfy the cursory inspection usually given to such signatures at the location of use. It is thus possible for a thief to use a stolen card for a period of time as if he were the true owner thereof. Losses due to theft and fraud of credit cards currently runs at many millions of pounds per annum.

Many attempts have been made to personalise credit and other cards so that it is possible to verify that the person presenting the card is the true owner. Such proposals have in general required the incorporation of a secret code within the magnetic strip or some other medium carried by the card which the presenter has to identify correctly when using the card. For example, bank cards require the identification of a special number (the PIN number) before the card can be accepted. However, many users carry their PIN number written down on a cheque book or the like which they carry with their cheque card to act as an aide memoire, notably where they use more than one bank or credit card. When the card is stolen, the PIN number often becomes available to the thief and he can thus present the card as if he were the true owner. The more complex the PIN or other code to be identified, the greater the security against a thief randomly picking the correct code; but the more likely it is that the owner will carry some form of aide memoire. Furthermore, the use of a PIN number is only possible where the number can be verified on site when the card is presented. This effectively limits the use of the PIN number to locations either linked to the central location from which the PIN number was issued, for example to banks which are linked via a data transmission network, or to locations having means for keying in data on the PIN number and verifying that against the card. Many locations, e.g. retail stores or garages, do not have these facilities.

It has been proposed to use a photograph of the card user as a supplement to or in place of the PIN number on a card to increase the security thereof, but sophisticated photographic and other techniques have enabled acceptable forgeries to be produced readily. Furthermore, verification of the identity of the presenter's photograh is again often cursory.

It has also been proposed to incorporate coded information e.g. in binary coded form, about the person's fingerprint on the card and to compare this information with a corresponding record held in a data base. In one form of such a proposal, the whole of the fingerprint image is stored upon the card and when verification is required it is necessary to display both the presenter's fingerprint and the print extracted from the record on the card for visual comparison. In an attempt to mechanise the comparison of the fingerprint with the stored data, it has been proposed to store the data either on site at the location where identification is required or at a remote location which is accessed from the verification site. In the former case, the amount of data required to enable identification to be carried out means that records of only a few people can be stored on site. Where a remote data store is used, this can store data for a large number of people, but the verification time is then far longer than members of the public would accept and, again, the system is of use only at those locations which have access to the remote data base.

It has also been proposed to record only some of the data relating to the identity, orientation and position of certain characteristics of a person's fingerprint on the card and to compare that with the corresponding finger print presented by the user. Whilst this may reduce the amount of data required to be stored on the card, the accuracy of that method is stated by one source to be as low as 2%, making it unacceptable for many commercial operations unless it is supplemented by some other form of identity check carried out at the same time.

The need to relate the identity of a person to a document purporting to identify or relate to that person arises in a wide number of other circumstances, for example to control access to high security areas in buildings, at polling stations during elections, at immigration checks at air ports and the like, and in general at any location where a lock mechanism is used to prevent unauthorised access to a locus or use of a device. The need for a simple and accurate method for identifying or relating a person to a document or other object is thus widespread and of increasing importance. So far, despite all the previous proposals, no satisfactory solution to the problem has been proposed.

I have now devised a system by which the identity of a person can be rapidly and accurately verified or related to a document or other thing presented by that person, but which can be adapted for use wherever such relation or verification is required without the need for a complex and costly data base either on site or at a remote location. Furthermore, since the information used in the verification is based on physical characteristics of the person's body, notably the ridge pattern on his finger, the user does not have to carry any PIN number or other aide memoire.

SUMMARY OF THE INVENTION

Accordingly, the present invention provides a method for verifying the identity of a person or for relating the identity of a person to a document or other thing presented by that person, which method comprises:

a). Observing topographically related permanent natural physical characteristics on a person to provide a machine readable identification of the identity, relative orientation and relative location of a plurality of the observed characteristics; and b). Comparing the observed characteristics with a machine readable record of the identification of the identity, relative orientation and relative location of the corresponding topographically related permanent natural physical characteristics purporting to belong to that person;

c). Establishing the existence or otherwise of substantial identity between a plurality of the characteristics held in the record and those observed, the establishment of identity being based upon the identification, relative orientation and relative position of at least some of the characteristics;

characterised in that the establishment of identity also includes:

i) selecting a first set of at least three of the characteristics, which may be the same or different, from the record and a second set of at least three of the characteristics, which may be the same or different, from the observed characteristics;

ii) counting the numbers of some other permanent natural physical feature lying between each of the characteristics with respect to each and every other member of that set for each of the first and second sets; and iii) comparing the counts for each and every characteristic in a set with the corresponding counts for the other set to substantiate identity between the two sets.

The method of the invention can be applied to a wide range of topographically related physical characteristics and features on the body of a person or an animal, for example the ridge patterns on the palm of the hand, on the toes and from the sole or heel of a foot. Thus, the invention can be used to provide means for identifying invalid or paraplegic persons who can not readily provide finger prints, or victims of malformation or accidents who do not possess hands or have lost fingers. However, the invention is of especial application in the use of finger print characteristics and features to provide a simple and secure method for identifying a person. For convenience the invention will be described hereinafter in terms of this preferred application.

Since the data required for operation of the method of the invention is usually less than that required in other systems, it is possible to hold all the necessary data in the magnetic stripes on a card or in a small memory chip, for example as used in the so called Smart card. There is therefore no need for a separate large data store and the system of the invention readily lends itself to use where on-the-spot identification and/or verification is required, for example at retail store, bank or garage cashpoints. Since no image of the fingerprint can be recovered from the characteristics stored in the record, the psychological objection many users have to the concept of someone else holding their fingerprint record is overcome.

Thus, in a preferred method of the invention, the characteristics on a finger of a person are compared with the record purporting to be that of the corresponding finger of the person to determine substantial identity of a number of finger print characteristics and the ridge counts between sets of those characteristics.

The term "permanent natural physical" is used herein in terms of the characteristics and features of a person to denote a feature of characteristic which is present from birth on the body of the person and remains present throughout the normal life of the person. The term does not include features which are of a transient or temporary nature or features which are introduced after birth. Thus, examples of permanent natural pysical characteristics include the interruptions in continuity of the ridges on a finger and the ridges themselves are permanent natural physical features. By way of contrast scars or creases in the scin are either not natural and/or not permanent.

Figure 1:
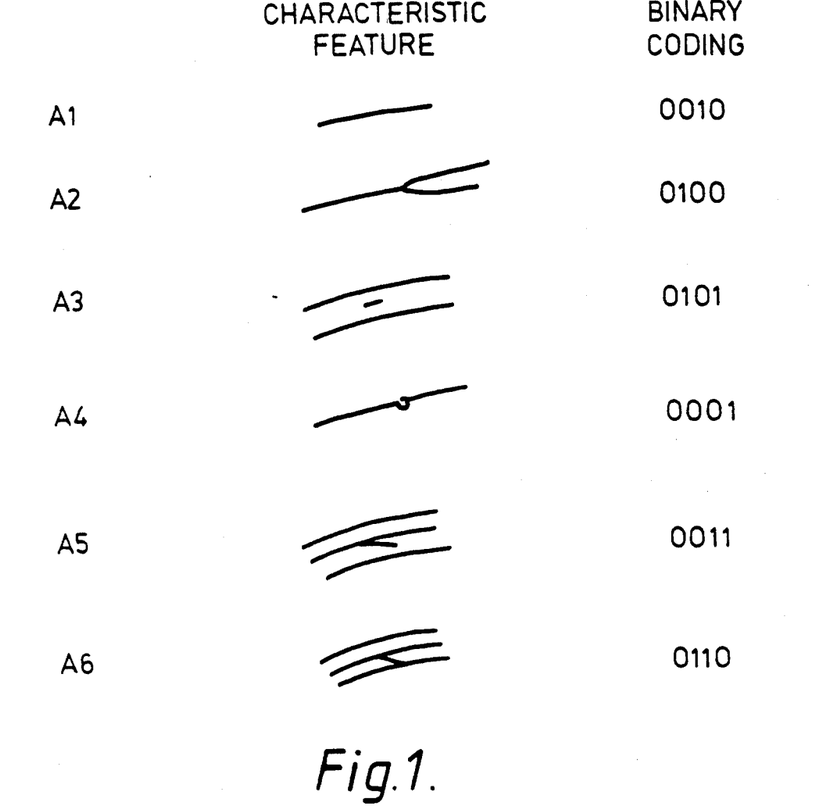
FIG. 1 is a diagrammatic representation of six characteristics used in classifying a finger print, together with examples of binary coding which can be used to describe such characteristics.

Finger prints are classified by the patterns of the ridges which occur on the skin covering the finger tip. These ridges are not continuous and break, branch or form loops or other interruptions which can readily be identified in a finger print. The most common of these interruptions are shown diagrammatically as A1 to A6 respectively in FIG. 1 of the attached drawings. For convenience, the term "characteristic" will be used herein to denote singly and collectively the interruptions A1 to A6 as described above. The method of the invention can be applied using the identification and correlation of all of the above interruptions. However, it will usually be sufficient to identify the interruptions as either ridge ends or ridge bifurcations, the other interruptions being variations of these two basic characteristics. For convenience, the invention will be described hereinafter in terms of the use of this limited identification of the characteristics.

The skin on a finger from its tip to the first joint may carry a number, typically up to 80, of the characteristics. In the method of the invention a finger print is scanned to detect the characteristics present and to determine the identity, the relative position and relative orientation of those characteristics and also the number of ridges which occur between each and every one of a selected group of those characteristics.

The term "coincident sequence" for a set of finger print characteristics is defined herein as being:

1. identity of the type of the finger print characteristic;
2. the relative location of that characteristic to the others in the group;
3. the orientation relative to the other characteristics in the group; and
4. the count of the ridges lying between any one characteristic and each and every other characteristic in the set.

For a coincident sequence to exist there must be at least three characteristics in the set being inspected; and preferably at least one characteristic in that set is different from the other characteristics in the set. Whilst the method of the invention can be applied to the location of a coincident sequence of three characteristics in both of the record and the observed finger print, it will be appreciated that the higher the number of coincident sequences required, the more positive will be the verification of identity between the two sets the smaller the error rate in making a positive identification. It is therefore preferred that from six to twenty, notably from eight to seventeen, characteristics in coincident sequence in each set should be required in making a positive identification using the method of the invention.

Thus, from a preferred aspect, the present invention provides a method for verifying the identity of a person or relating the identity of that person to a document or other thing presented by that person at a locus or held in a record available to the locus, which method comprises scanning the finger of the person at the locus to provide a machine readable identification of the identity, relative location and relative orientation of the characteristics in coincident sequence of the finger print of that person; comparing that identification with a machine readable record of the characteristics in coincident sequence from a finger print purporting to be that of that person which has been obtained beforehand and which is presented to the locus concurrently with the finger of the person either on the document or other thing or from a separate record so that the existence of identity of part of all of the coincident sequences of the observed characteristics of the presented finger and the record can be established. Preferably, the coincident sequence contains at least 8 characteristics ensure that a unique correlation between the identification and the record is achieved.

The method of the invention can be applied to a wide range of types of record which are to be compared with the actual finger print of the presenter. Thus, the invention can be applied to a plastics or similar card for use in financial transactions, to a cheque, to pages of an identity document or passport which are presented by the user for verification or to identify the presenter to another. Alternatively, the record can be held in part of a mechanism which is to be actuated once the identity of the person has been verified. For example, the invention finds use in providing security locks for hotel bedrooms, offices or other locations where it is desired that only certain people should have access. In these cases the record of the finger print can be located in the lock mechanism so as to permit only accepted people to operate the lock mechanism. Alternatively, the mechanism can be linked to a remote memory/programming centre where the finger print characteristics of the user are encoded and stored for future use at the mechanism. For example, the characteristics can be encoded at the reception desk of a hotel when the user registers and that information used to encode the lock for his room. The lock mechanism has a scanner unit which observes the characteristics of a finger presented to it, transmits those to the memory/programming centre for verification and releases the lock once verification has been achieved or ferers to its own encoded memory for the verification.

For convenience, the present invention will be described hereinafter in terms of the use of a plastics card or the like to provide the record for comparison with the actual finger print characteristics in coincindent sequence of the presenter in situ at the location where verification is to take place.

For the method of the invention, the record of the characteristics in coincident sequence of the user's finger print is first obtained in a machine readable form for inclusion in the record to be read at the locus at which the user is to present himself. This is usually done by scanning the designated finger of the person. The scanning can be carried out using a number of techniques, e.g. optically using high intensity illumination and an array of photosensitive diodes as a camera to record the image or some other optical scanning device such as a laser scanner, to provide an image which can be processed electronically. The scanning device is coupled to an image processor, typically incorporating one or more microprocessors and programmed to scan the image observed to identify the finger print characteristics, to assign them a binary code identifying them and ascribing them binary codings identifying their position and orientation reltive to other characteristics observed. The processor will also observe the ridge count between each and every one of the characteristics to build up the record of the coincident sequences within the record.

The record can be built up in a series of stages, as when the image processor tracks the line of each ridge observed by the scanning means to locate any characteristics along that ridge. Alternatively, the scanner can merely locate the characteristics and ascribe the relevant binary codings to them for identity, orientation and location; and subsequently establish a ridge count between the located characteristics. For the purposes of the record, it is not necessary that all the finger print be scanned and all characteristics be identified and coded. However, it is preferred that at least 10, and preferably 20 to 40, of the available characteristics be identified and encoded for the record to provide a sufficiently large record from which to compensate for dirt or blemishes in the finger print which is subsequently scanned or for malfunctions in the apparatus to ensure that sufficient valid characteristics can be available for comparison purposes during the verification process.

The record of the finger print characteristics in coincident sequence is preserved in any suitable form which can be readily stored and/or carried and presented by the user. Thus, the information can be stored as a series of electronic signals on a magnetic recording medium, as signals within a read only memory chip, which can be programmable, or as signals in an optically scanned medium carried on or in the card, e.g. in holographic form or as a laser readable strip on the card. For convenience, the invention will be described hereinafter in terms of binary coded signals recorded on a magnetic medium, notably in the form of a strip of magnetic medium carrying the record thereon and integrated with the card.

In addition to the information about the characteristics of finger print of the person in coincident sequence, the record may also contain information about the person, e.g. his name and address, bank account number and so on. If desired, the record can be formed in two or more sections, e.g. with two separate magnetic strip areas on a card, so that the finger print information can be scanned separately from the other data.

The record can be taken from any finger of the person, for example from the small finger of the left hand for one person, whilst another person can use the print from the middle finger of his right hand for creating the record. It will also be appreciated that the record can carry information relating to more than one finger of the person so that he can select the alternative information if one of his fingers should not be available for scanning at the verification locus, as when the finger is bandaged.

As indicated above, the apparatus for scanning the finger print to prepare the record can be selected from a wide range of suitable apparatus and many forms of such apparatus are available commercially, for example as the finger print scanners in those methods which use only the spatial configuration of the finger print characteristics. Thus, the apparatus will typically comprise a finger rest having a translucent section through which the ridge pattern on the finger can be observed. The rest typically comprises a generally circular cross-section channel into which the user places his selected finger. The channel preferably has an end stop to limit the extent of penetration of the finger axially along the channel so that approximately the same area of the finger will be scanned for each user.

The ridge pattern on the finger in the channel is observed by a suitable sensor, e.g. a camera or scanner, notably a photosensitive diode array. This can scan the ridge pattern from a fixed point or, more preferably, can traverse around the axis of the finger to scan the ridge pattern from a range of angles. Alternatively, the characteristics of the finger print can be sensed using a pressure sensitive pad.

The data provided from the sensor is processed to provided the necessary binary coding of the characteristics and the ridge counts between them. This is achieved in known manner using conventional electronics circuitry and computer components, e.g. to convert an intial visual image to suitable electronic signals for retention in the recording medium. Typically, the circuitry will cause the ridge pattern to be scanned to identify the desired characteristics, which may be stored in a read only memory for ease of identification, with the ridge count between each and every characteristic being computed as each new characteristic is located. Alternatively, information for each characteristic located can be encoded directly into the record to build up topographical information on the ridge characteristics. The ridge counts between each and every one of a selected group of the recorded characteristics can then be made as a second function once the data on the characteristics has been captured and encoded. The encoding is preferably done using an n-tuple algorithm or other system using conventional computer techniques.

The coding of the ridge characteristics and the ridge count between them is stored on the recording medium of the card using the card encoding equipment presently available commercially for this purpose. Thus, a magnetic stripe on a plastics card can have the binary coded information recorded on it as if that information were conventional account information as currently recorded on the magnetic stripe on the card.

As indicated above, it is not necessary for the full information about all characteristics on the finger to be encoded and recorded. In a preferred embodiment of the invention, establishing identity between coincident sequences in two to four sets of four characteristics each from the record and the observed finger will give satisfactory results for most applications. Thus, it is necessary to ensure that at least eight characteristics and their ridge counts are recorded on the card. This will, however, provide no margin of error in case the person's finger print should be damaged or masked by dirt, or allow for any malfunctions in scanning the presenter's finger when verification is carried out. It will therefore usually be desired to encode data for at least 10, and usually 20 to 40, of the characteristics present on the finger print being scanned.

The above method provides the data upon the card which forms the record against which the user will subsequently have to verify his finger print characteristics at the verification location. At this location, the finger print of the presenter will be scanned using a similar technique to that outlined above for preparing the encoded data for recording on the card. The data from this scanner is compared with the data held in the record to establish whether or not identity between a sufficient number of coincident sequences in the record and the finger being scanned to show that the two are from the same person. As indicated above, it is preferred that there should be at least 8 features from each of the record and the scanned finger which are in coincident sequence with one another.

The comparison between the record and the finger being scanned need not be carried out in a specified sequence, but can randomly locate characteristics common to the record and the scanned finger and then check whether those features are in coincident sequence with characteristics already identified as in coincident sequence so as progressivly to build up the desired total of characteristics in coincident sequence. Alternatively, the comparison can be carried out in two stages. Firstly to establish identity of type, position and preferably orientation for at least 8 characteristics between the record and the finger being scanned. Where is is that 8 characteristics are to be in coincident sequence, it will be preferred to identify 16 or more characteristics in this stage to provide a margin in case of dirt or damage to ridges preventing an accurate ridge count to be taken for some of the characteristics identified. From the characteristics that have been identified as the same for each of the record and the scanned finger, two or four sets of three or four characteristics each are selected from each of the record and the scanned finger, preferably one set from each quadrant of the finger print pattern. Ridge counts are then done for the characteristics of the finger being scanned between each and every characteristic within those sets and compared with the ridge counts for the record or vise versa. The ridge counts are preferably done firstly within each set and then from one set to another. In this way, the verification of the match between the record and the finger being scanned is carried out progressively and if there is a failure to achieve coincident sequencing due to dirt or a blemish on the finger being scanned, the match can be aborted at an early stage and a fresh match sequence initiated.

The reading of the record on the card and the scanning of the finger can be carried out in either order or simultaneously and the term concurrently is used herein to denote both consecutive and simultaneous operation.

The data encoded onto the record and as handled during the scanning and comparison of the characteristics at the verification stage can be simple binary code information. However, in order to reduce the risk that unathorised versions of the record might be made and-/or forged versions of the card made, it is preferrd to further encode the information to make it difficult for unauthorised use of the card encoder or the finger print scanner.

As indicated above, the scanning of the finger and the processing of the data therefrom to provide information on the coincident sequences in the characteristics observed during the scannoing can be carried out using conventional equipment which can embody many of the features described above for the preparation of the record. The comparison of the record with the information from the scanning of the finger can be done using conventional computer techniques oncew the coincident sequences have been identified. Thus, the apparatus for use in the method of the invention will typically comprise a means for scanning a finger of a person to provide signals defining the identity, location and orientation of characteristics of the ridge pattern of that finger and to identify the presence of ridges between each and every one of the characteristics located; means for receiving signals from a record purporting to contain information on characteristics corresponding to those located on the scanned finger; and means for identifying coincident sequences in that record and the characteristics located ion the scanned finger; and means for comparing the coincident sequences to establish identity therebetween.

From a particularly preferred aspect, the invention provides apparatus for verifying the identity of a person using the method of the invention which apparatus comprises a means for scanning a finger presented to rt by that person at the locus at which an operation is to be carried out so as to provide information in machine readable form corresponding to the nature, location and orientation of the characteristics of the finger print observed and a ridge count between each and every one of a selected group of the observed characteristics; means for receiving a card or other means carrying a machine readable record of the finger print characteristic features purporting to be those of that person and for scanning the record carried by that card; means for comparing the information from the scanning means and the record so as to detect the presence of coincident sequences within at least some of the characteristics recorded in the card or the record and for establishing identity or not between those coincident sequences; and means for initiating the operation to be carried out.

The invention also provides a card or other means carrying in machine readable form information identifying the characteristics of the ridge pattern of a finger of a person and identifying the type, relative location and relative orientation of those characteristics to one another and the count of the ridges in the finger print pattern of the person ocurring between each and every one of a selected group of those characteristics.

The method and apparatus of the invention find widespread use wherever it is desired to verify the identity of a person to permit some operation to be carried out. Since the user presents a unique identifier to the apparatus (his actual finger print) and this is verified against a record of that identifier at the location of verification, not only does the method provide a high degree of security, but this is achieved by a simple means not requiring large data stores or visual inspection.

The invention finds use in reducing fraudulent and unauthorised use of credit and other cards to achieve goods and/or finance; to provide a personalised "key" to gain access to a location or to actuate a mechanism such as a car ignition switch or to unlock a door to a room; to provide a simple means for establishing that the carrier of a passport is the person referred to therein, thus facilitating immigration and other identity checks at frontiers or elsewhere.

The invention can be implemented by supplying the necessary finger and card scanning apparatus in place of the conventional card accepting apparatus used at present. However, some present apparatus already incorporates card scanning means, for example cash dispensers in banks or hotel card key systems. In this case that apparatus can be modified to operate the method of the invention by providing a finger scanning apparatus and comparitor means and linking those into the existing apparatus. Since the verification can be carried out without the need for any separate data record, the invention can be used in almost any location and is not limited to use at those locations having access to information networks or data bases as with some current proposals.

BRIEF DESCRIPTION OF THE DRAWINGS

Apparatus for use in the present invention will now be described by way of example with respect to the accompanying drawings in which.

DESCRIPTION OF THE PREFERRED EMBODIMENTS

Figure 2:
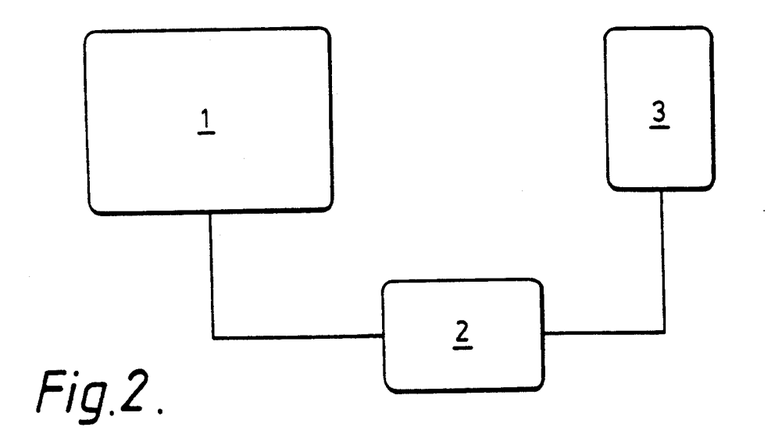
FIG. 2 is a schematic representation of an apparatus according to the invention.
Figure 3A:
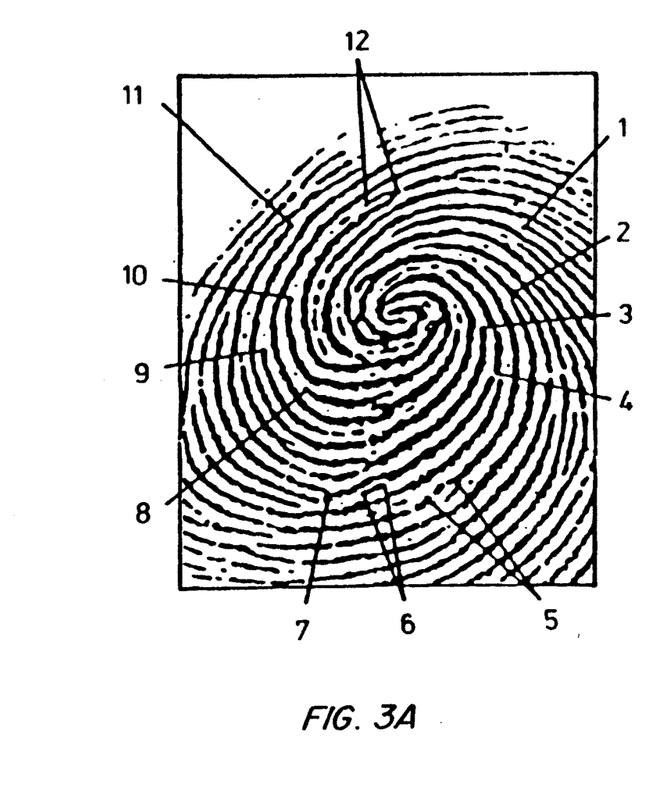
FIG. 3a shows two finger print ridge patterns identifying some of FIG. 3b the characteristics from FIG. 1 thereon.
Figure 3B:
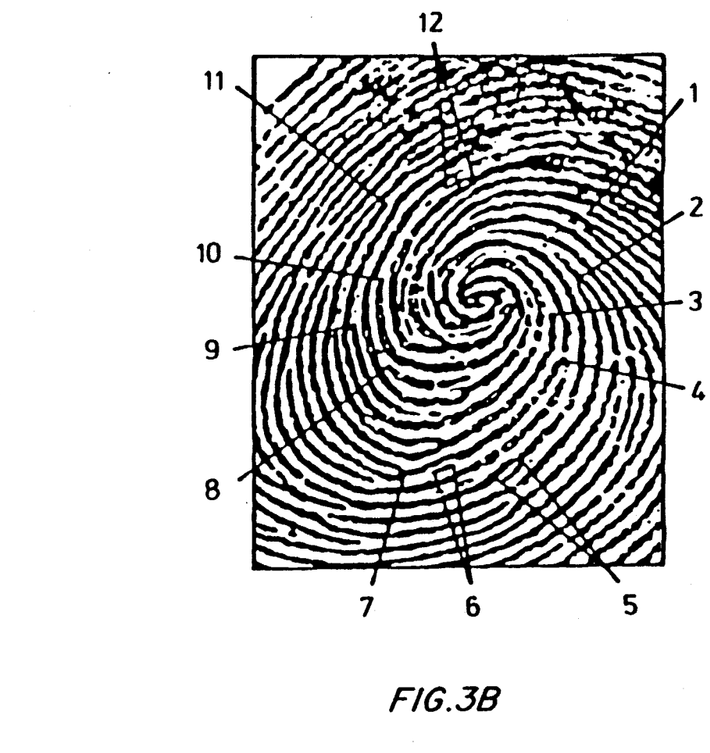

The apparatus for use in the invention comprises a device (1) with a read only memory (ROM) for scanning the finger of a person at the verification site. The ROM has programmed therein an image of each of the six ridge characteristics shown in FIG. 1, together with an image of a typical ridge. The scanning device and ROM (1) combination are controlled by a processor (2). For the purpose of scanning a finger for the first time, the processor (2) will instruct the device (1) to scan the finger and by plotting the coordinates of the scanner an any instant during the scan will, when the ROM recognises one of the six ridge characteristics, assign a unique binary character combination for the recognised ridge characteristic, its direction and its coordinates.

On recognising a second ridge characteristic, the processor (2), via the device (1), will have information as to the number of ridges between the first recognised ridge characteristic and the second recognised ridge characteristic. The scanning process continues in this fashion until there is stored in the processor (3) a plurality of binary character combinations representing the fingerprint characteristics. Thus a digital record of the fingerprint characteristics, their direction and relationship to each other (coincident sequence) is generated. Typically anything from 40 to 80 recognisable ridge characteristics will be stored in the processor (3).

To generate a strip material according to the invention, the processor (3) transfers, in a known fashion, the binary character combinations onto the strip material. Other information relating to the holder of the finger scanned by the device (1) may also be encoded onto the strip material.

The strip material may already be, or subsequently be, laminated with and/or attached to an identity card as hereinbefore referred to, to produce an identity card according to the invention.

At the site of use, the identity card is inserted into a card or strip material reading device, via a card input (not shown), the information on the strip material being read by a second ROM. A finger of the user of the identity card is scanned by the device (1). The processor (2) will generate binary character combinations for the ridge characteristics, their direction and their coordinates and compare the combinations thus generated with the binary character combinations of the strip material. If sufficient ridge characteristics in the same coincident sequence that are found on the finger being scanned are also read from the strip material, then a positive correlation will result.

Depending on the type of correlation resulting from the comparison between the character combinations found on the strip material and those scanned by the scanner, a signal is sent from processor (2), for example, to one of three different indicators via a circuit (not shown) for converting the signal received from the processor (2) into another signal to light one of three indicators or display a signal on a suitable display (not shown). If the correlation is positive, then one of the indicators (for example) is lit. The lighted indicator may bear a legend or a colour to indicate to the recipient of the identity card that the presenter is the authorised user and permit a transaction to take place. The other two indicators may serve to indicate a negative or no correlation result. In the case of a negative correlation, no transaction takes place and one of the indicators is lit which indicates to the recipient that the presenter in not the authorised user of the card. In this instance, the unit can, if required, retain the card. In the case of no correlation the third indicator is lit and the user of the card may be requested to try again. A no correlation result may be obtained, for example, through a malfunction of the device, through a blurring of the scan because the finger is excessively dirty or the scanning surface plate or glass is dirty, or through damage to the identity cards memory device.

I claim:

1. A method for preparing a record of machine readable signals in a machine readable storage medium for use in the verification of the identity of a person or animal by comparison of the characteristics of the ridge pattern observed on a surface of the skin of the body of the person or animal with the record of characteristics purporting to belong to that person or animal, the method being characterized in that:
   a. the ridge pattern of at least a part of a friction skin surface of the person or animal is observed by a scanning means operatively associated with a signal processing means so as to generate machine readable signals identifying the type, the relative location, and the relative orientation to one another of at least four characteristics in at least part of the observed ridge pattern of the skin surface;
   b. further generating as additional information from the observation for each of the said at least four characteristics, one or more machine readable coding identifying the count of the ridge pattern occurring on a plurality of imaginary straight lines drawn between that characteristic and each and every other one of those said at least four characteristics; and
   c. storing said machine readable signals in a machine readable storage medium to provide the said record.

2. Apparatus for use in verifying the identity of a person, which apparatus comprises:
   apparatus for scanning a finger of a person;
   a signal generating apparatus operatively associated with the finger scanning apparatus and programmed to generate machine readable signals identifying the type, relative location and relative orientation of selected characteristics of the ridge pattern observed from that finger;
   apparatus for scanning a record containing machine readable signals identifying the type, relative location, relative orientation and ridge counts for characteristics of a finger print;
   signal comparison apparatus for receiving the signals from the record scanning apparatus and from the finger scan signal generating apparatus, which comparison apparatus is programmed to compare the record and scanned finger signals so as to identify machine readable signals for characteristics from the record and from the characteristics located on the scanned finger which are identical;
   which apparatus is characterized in that:
   a. a selected one of the finger scanning apparatus and the signal generating apparatus associated therewith is programmed to carry out the additional operation of counting the number of ridges on direct imaginary lines drawn between each and every one of the characteristics located; and
   b. the machine readable signals in the record contain for each characteristic in the record the additional information of the count of the number of ridges between each characteristic and each and every other characteristic in the record.

3. Apparatus for use in a method for verifying the identity of a person or animal by comparing the ridge pattern on a surface of the skin of that person or animal with a machine readable record of characteristics of the ridge pattern of a skin surface purporting to be that of the person or animal whose identity is being verified, which apparatus is characterized in that it comprises:
   a. means for scanning a skin surface of the body of a person or animal to observe characteristics in the ridge pattern of the skin surface,
   b. signal generating apparatus operatively associated with the scanning means and programmed to generate machine readable codings identifying the type, relative location and relative orientation of at least four of the observed characteristics of the ridge pattern of that finger and the count of the number of ridges between each and every one of the said at least four observed characteristics;
   c. means for scanning a record containing machine readable codings which identify the type, relative location, relative orientation and ridge counts for a ridge pattern purporting to correspond to that observed during the skin surface scanning operation;
   d. signal processing means for receiving the signals from the record scanning operation and from the skin surface scanning operation, which processing means is programmed to process the record and scanned signals so as to establish identity or otherwise between the type, relative location, relative orientation and ridge counts of at least four of the characteristics in the recorded and the observed characteristics.

4. Apparatus according to claim 3, characterized in that it comprises:
   a. a means for scanning a finger presented to it by a person at the locus at which an operation is to be carried out so as to generate signals in machine readable form identifying the type, relative location and relative orientation of characteristics in the ridge pattern of the finger print and identifying the number of ridges in the ridge pattern between each and every one of a selected group of the characteristics located during the scanning operation;
   b. means for receiving a card or other means carrying a record of machine readable signals relating to the type, relative location, relative orientation and ridge counts of characteristics purporting to be those of the finger print of that person and for scanning the signals of that record so as to generate a series of records signals;
   c. means for receiving the machine readable signals from the scanning of the finger and from the scanning of the record and for comparing the signals, which means is programmed to detect the presence of characteristics in both the record and those selected from the observed characteristics which are of the same type, have the same relative location and relative orientation and between each of which there are the same individual ridge counts; and d. means for generating a signal to initiate the operation to be carried out when a required minimum number of the characteristics from the record and those observed have been detected as having the identity of type, relative location, relative orientation and ridge counts.

* * * * *